(12) United States Patent
Wu

(10) Patent No.: US 7,400,463 B1
(45) Date of Patent: Jul. 15, 2008

(54) MINIATURE LENS FOCUSING MECHANISM

(75) Inventor: Fu-Yuan Wu, Yangmei Taoyuan (TW)

(73) Assignee: TDK Taiwan Corp., Taipei (TW)

( * ) Notice: Subject to any disclaimer, the term of this patent is extended or adjusted under 35 U.S.C. 154(b) by 0 days.

(21) Appl. No.: 11/714,169

(22) Filed: Mar. 6, 2007

(51) Int. Cl.
*G02B 7/02* (2006.01)
(52) U.S. Cl. ...................... 359/824; 359/819
(58) Field of Classification Search ............... 359/824, 359/811, 813, 819, 821, 822, 823
See application file for complete search history.

(56) References Cited

U.S. PATENT DOCUMENTS

2007/0177279 A1* 8/2007 Cho et al. .................... 359/692

* cited by examiner

*Primary Examiner*—Ricky L Mack
*Assistant Examiner*—Brandi N Thomas
(74) *Attorney, Agent, or Firm*—Rosenberg, Klein & Lee

(57) ABSTRACT

A miniature lens focusing mechanism includes a lens holder, at least one winding element surrounding the lens holder, at least one elastic element connected to the lens holder and the at least one winding element, and at least one magnetic element. When a current is supplied, the current is transmitted via the elastic element to the winding element, so that an acting force is produced between the winding element and the magnetic element to displace the lens holder and accordingly, achieve the function of auto-focusing.

4 Claims, 6 Drawing Sheets

MINIATURE LENS FOCUSING MECHANISM

FIELD OF THE INVENTION

The present invention relates to a miniature lens focusing mechanism, and more particularly to a miniature lens focusing mechanism that electromagnetically drives a lens to displace and thereby achieves the function of lens focusing.

BACKGROUND OF THE INVENTION

With the advancement in scientific technologies and the modularization and miniaturization of camera lens, it is now possible to produce digital cameras having a very small volume, and most of currently available mobile phones are provided with the function of a digital camera. In a miniature lens, there are many different auto-focusing driving mechanisms. Among others, voice coil motor (VCM) is the currently most widely adopted auto-focusing driving mechanism. The VCM has the advantages of small volume, low power consumption, accurately actuated displacement, and cost-effective, and is therefore very suitable for short-distance driving in miniature lens auto-focusing.

FIG. 1 schematically shows the basic principle of lens focusing. In a general focusing unit 10, there are included a lens assembly 11 and a photo sensor 12. With the lens assembly 11, light reflected from an object can form an image on the photo sensor 12. In the case a distance between the lens assembly 11 and the photo sensor 12 is fixed, that is, the lens assembly 11 is a fixed focal lens, only the object located more than two to three meters away from the lens can be clearly shown on the camera. If it is desired to own the macro shooting function, it is necessary to use an additional lens focusing unit to displace the lens assembly, so as to change the distance between the lens assembly and the photo sensor and thereby achieve the purpose of focusing. When the lens assembly is provided with the zoom function, multiple lens groups inside the lens assembly must also be displaced corresponding to the changes in zoom ratio. In this case, the focusing unit must also be included in the lens module to enable the displacement of the lens groups.

In the conventional focusing mechanism, the lens assembly is displaced mainly via a manually controlled mechanism, and is therefore not so convenient for operation. It is therefore tried by the inventor to develop an electromagnetically driven lens focusing mechanism, which not only has simplified design and improved assembling process to enable reduced manufacturing cost, but also overcomes the drawbacks in the conventional lens focusing mechanism, and can be advantageously applied to mobile phone, notebook computer, personal digital assistant (PDA), etc.

SUMMARY OF THE INVENTION

A primary object of the present invention is to provide a miniature lens focusing mechanism that has small volume and allows a largest possible lens, and electromagnetically drives the lens to displace and thereby achieves the function of focusing.

To achieve the above and other objects, the miniature lens focusing mechanism according to the present invention includes a lens holder for holding a lens therein, at least one winding element surrounding the lens holder, at least one elastic element connected to the lens holder and the at least one winding element, and at least one magnetic element. When a current is supplied, the current is transmitted via the elastic element to the winding element, so that an acting force is produced between the winding element and the magnetic element to displace the lens holder and accordingly, achieve the function of auto-focusing.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE INVENTION

Figure 1:
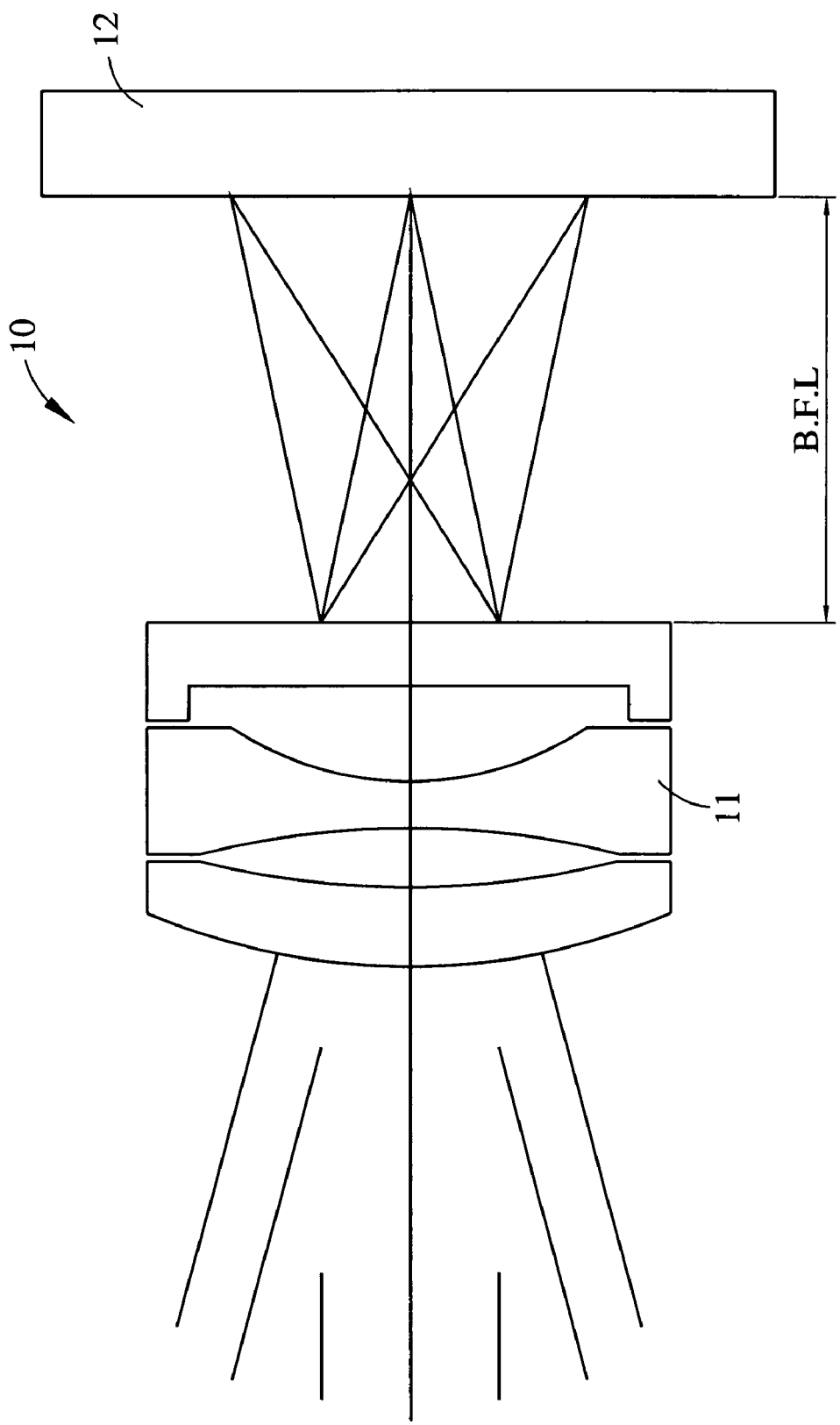
FIG. 1 is a schematic view showing a basic lens focusing principle.
Figure 2:
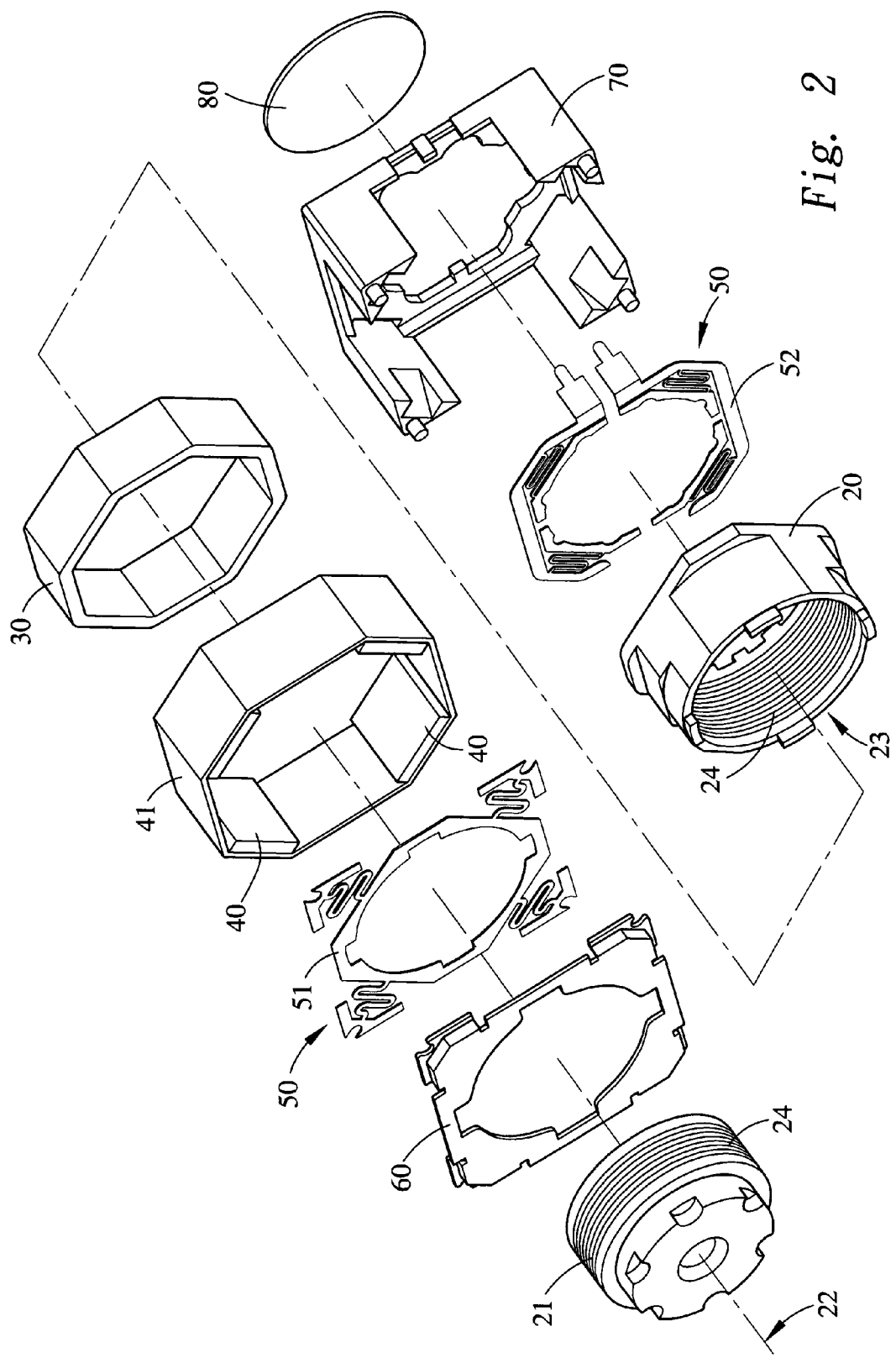
FIG. 2 is an exploded perspective view of a miniature lens focusing mechanism according to the present invention.

Please refer to FIG. 2 that is an exploded perspective view of a miniature lens focusing mechanism according to the present invention. As shown, the miniature lens focusing mechanism includes a lens holder 20, an upper cover 60, at least one elastic element 50, four magnetic elements 40, a winding element 30, a frame 70, and a photo sensor 80.

The lens holder 20 is used to hold a lens 21 therein. The lens 21 defines an axis 22, on which the lens 21 focuses light. The lens holder 20 is a hollow annular member and defines a through bore 23 along the axis 22. The hollow lens holder 20 is internally provided and the lens 21 is externally provided with corresponding screw threads 24, so that the lens 21 may be screwed in the through bore 23 of the lens holder 20.

The frame 70 is a hollow member, a projected inner profile of which in the direction of the axis 22 corresponds to an outer profile of the lens holder 20, such that when the lens holder 20 is received in the frame 70, the lens holder 20 is limited to linearly displace in the frame 70 without rotating relative to the frame 70.

Figure 3:
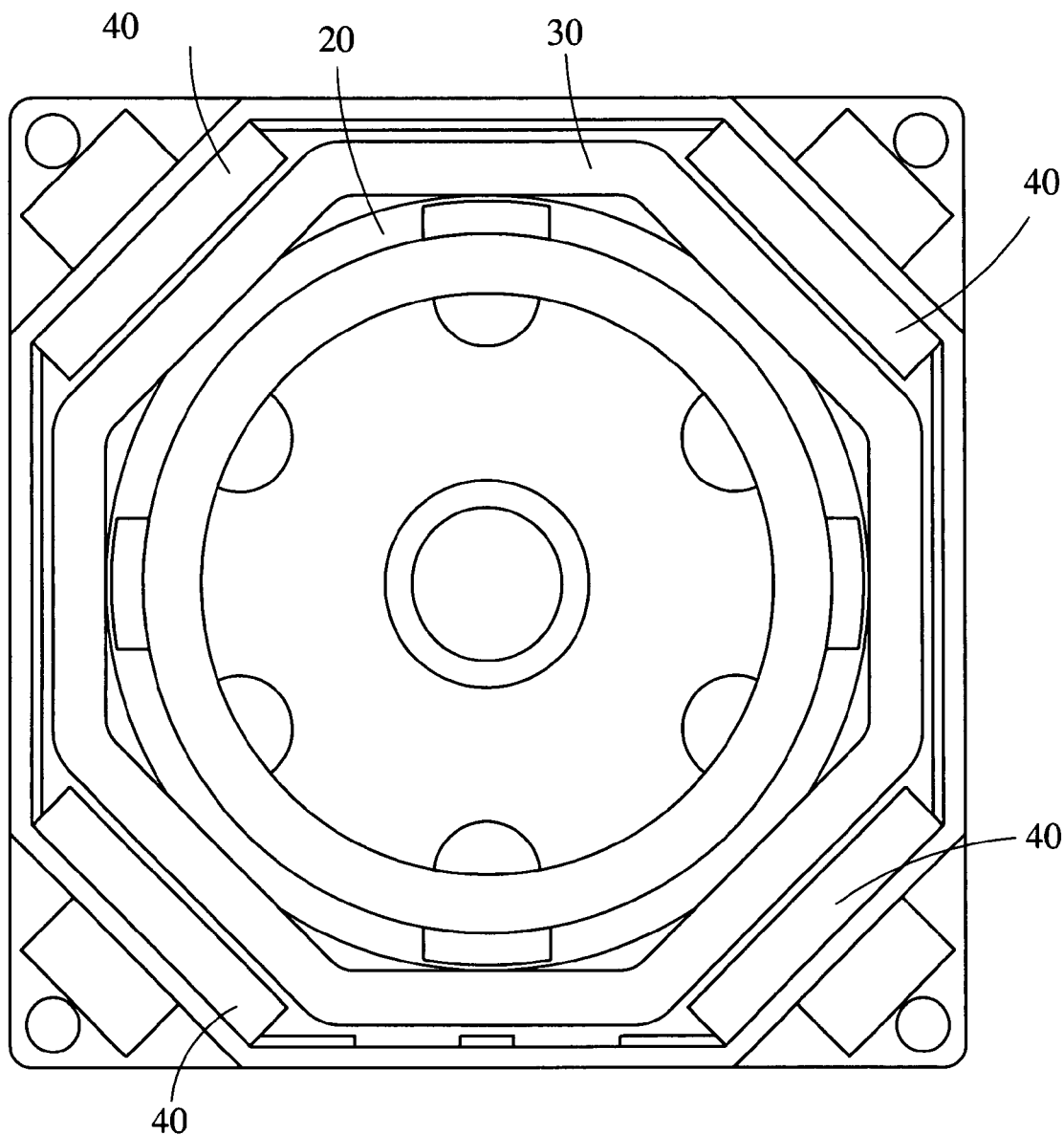
FIG. 3 is a schematic front view of the miniature lens focusing mechanism of the present invention.

As can be seen from FIG. 3, the winding element 30 is an octagonal member surrounded around the lens holder 20. When the lens 21 is screwed into the bore 23, torsion is produced. The octagonal winding element 30 is able to limit the angle by which the lens 21 may be turned to mount in the bore 23, so as to protect the lens holder 20 against a damaged internal structure by an excessive torsional force.

Figure 4:
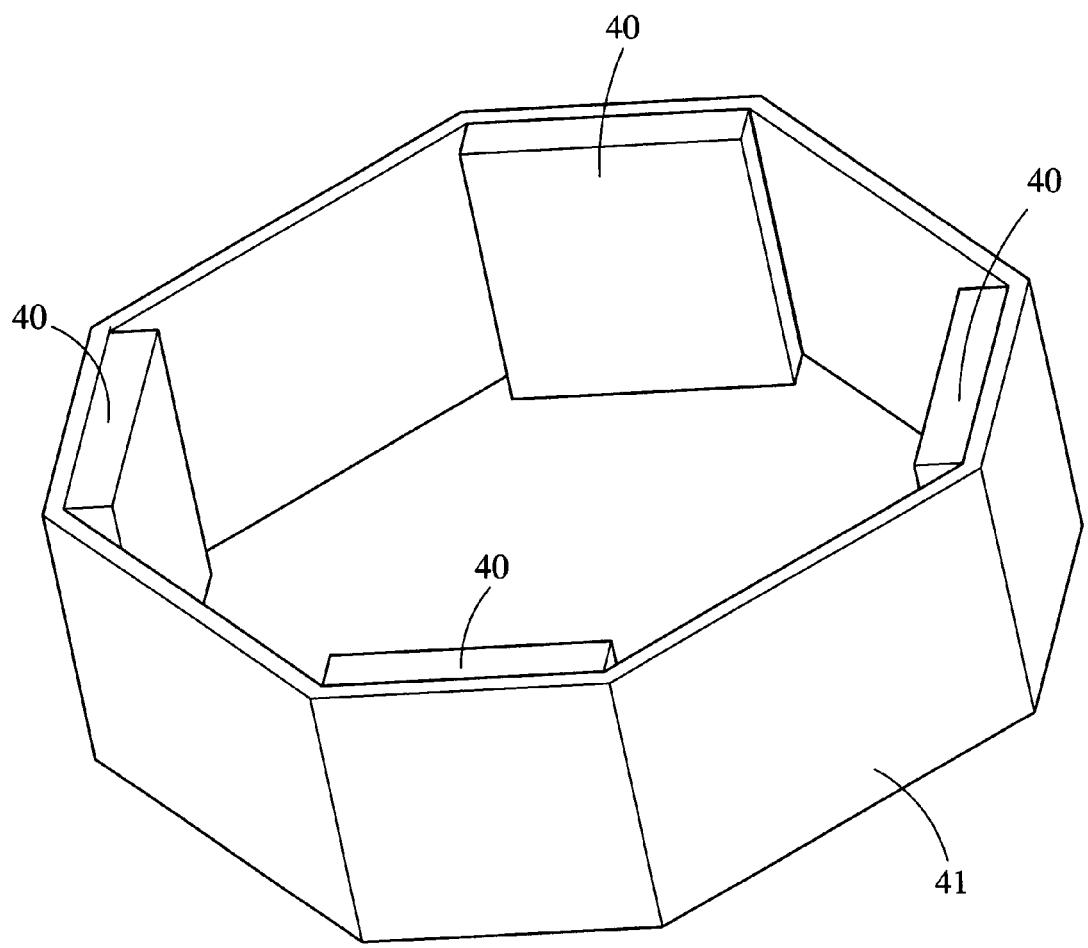
FIG. 4 is a perspective view of four magnetic elements used in the miniature lens focusing mechanism of the present invention.

Please refer to FIGS. 3 and 4 at the same time. The magnetic elements 40 are four permanent magnets located at the outer side of four of the eight sides of the octagonal winding element 30 to equally space from one another, allowing the lens 21 to have the largest possible diameter without increasing the overall volume of the lens focusing mechanism. The four magnetic elements 40 have a common outer ring member 41, which is in the shape of an octagon and made of a metal material to effectively close the magnetic field, so as to produce an even stronger and more efficient inner magnetic field without the risk of magnetic leakage.

Figure 5:
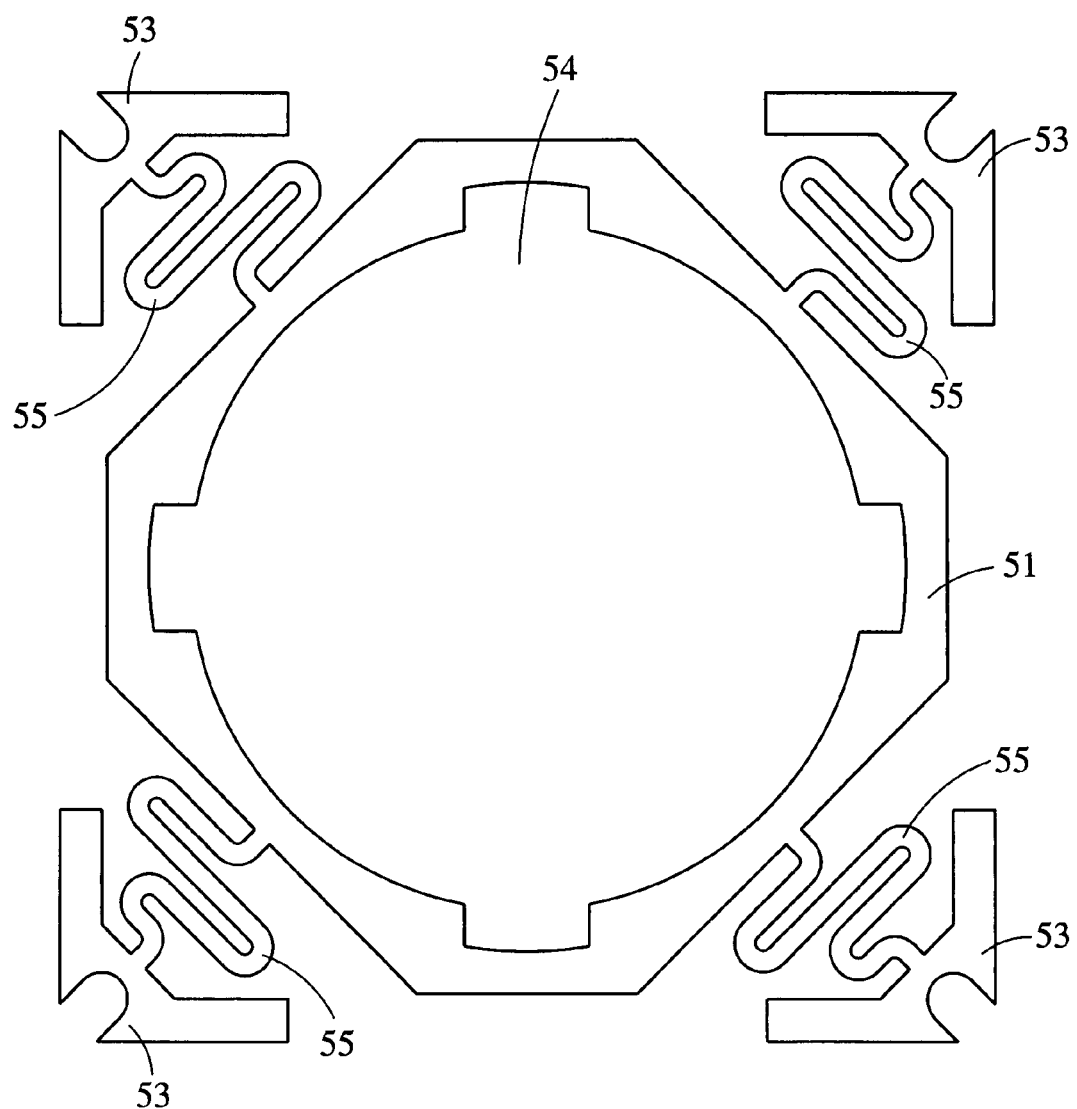
FIG. 5 is a front view of an elastic element used in the miniature lens focusing mechanism of the present invention.

Please refer to FIGS. 2 and 5 at the same time. The at least one elastic element 50 supports and connects the lens holder 20 to the frame 70, so that the lens holder 20 is suspended at a center of the frame 70. In the illustrated embodiment of the present invention, the at least one elastic element 50 includes an upper plate spring 51 and two lower plate springs 52. The upper plate spring 51 is connected to the lens holder 20, the frame 70, and the upper cover 60; and the lower plate springs 52 are connected to the lens holder 20 and the frame 70. The upper plate spring 51 defines a round opening 54, and has four fixing sections 53 and four serpentine sections 55. The round opening 54 is centered on the upper plate spring 51 to correspond to and hold the lens holder 20 in place. The fixing sections 53 are located outside four of eight sides of the octagonal plate spring 51 to equally space from one another and fixedly engage with the upper cover 60 and four pins correspondingly provided on the frame 70. The four serpentine sections 55 are extended between the four fixing sections 53 and the plate spring 52, so as to connect the plate spring 51 to the upper cover 60 and the frame 70. The four serpentine sections 55 effectively absorb impact, vibration, and reaction forces in X, Y, and Z directions, and function to even the reaction forces, so that the upper plate spring 51 is not subjected to deformation easily.

Figure 6:
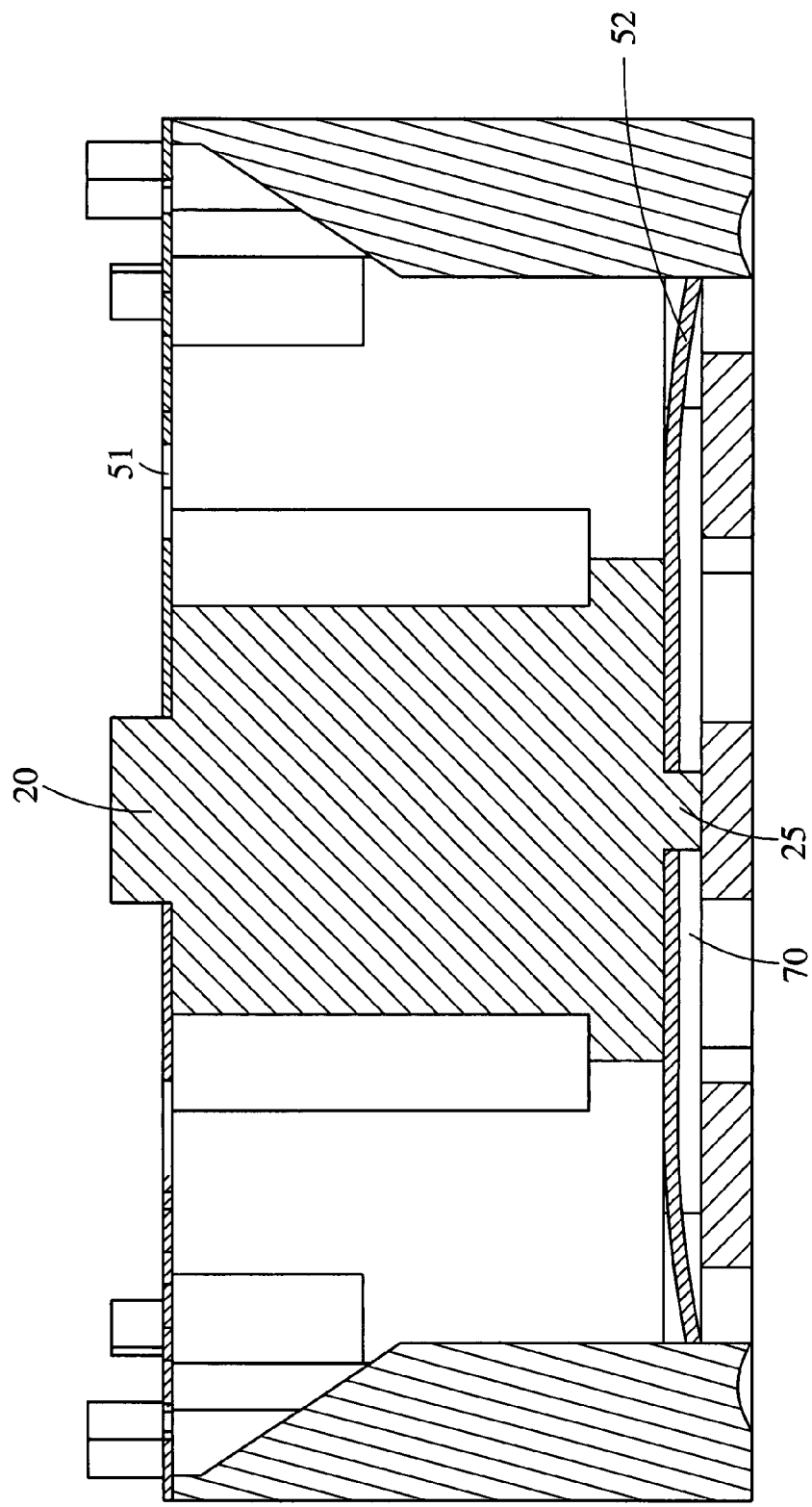
FIG. 6 is a sectional view of the miniature lens focusing mechanism of the present invention.

FIG. 6 is a sectional view of the miniature lens focusing mechanism of the present invention. As shown, the lens holder 20 is further provided at a predetermined position with a protruded section 25, which is pressed against and supported on a bottom of the hollow frame 70, such that the lower plate spring 52 is bent to produce a downward force, which always holds the lens holder 20 in place no matter the lens holder 20 is faced upward or downward, or in a horizontal position. That is, the lens holder 20 would not vibrate or displace when it is located at an initial position in any direction.

When the miniature lens focusing mechanism of the present invention operates, the winding element 30 and the magnetic elements 40 cooperate with one another to drive the lens holder 20 to linearly displace forward or rearward in the frame 70 along the axis 22. More specifically, when an electric current is supplied to the miniature lens focusing mechanism, the current is transmitted via the lower plate spring 52 to the winding element 30, so that the winding element 30 produces a magnetic field and accordingly, a push force, and cooperates with the magnetic elements 40 to drive the lens holder 20 to displace, so that the lens holder 20 and the lens 21 held in the lens holder 20 are fixed to a focused position to complete the lens focusing. The push force produced and provided by the winding element 30 is in a direction the same as that of a push produced by the magnetic elements 40 to thereby provide the lens focusing mechanism a substantially doubled push force to drive the lens holder 20 and largely increase the performance of the electromagnetically driven lens holder 20.

In the present invention, the octagonal winding element 30 protects the lens holder 20 against damaged internal structure by an excessive torsional force; the magnetic elements 40 enable the largest possible lens 21 without increasing the overall volume of the lens focusing mechanism; the outer ring member 41 for the magnetic elements 40 not only enables stronger and more efficient inner magnetic field, but also prevents magnetic leakage; the serpentine sections 55 protect the upper plate spring 51 against easy deformation; the protruded section 25 ensures that the lens holder 20 is not vibrated or displaced in an initial position in any direction. In conclusion, with the electromagnetically driven lens holder 20 and lens 21, the miniature lens focusing mechanism of the present invention has the advantages of good driving effect, small volume, large lens, and low manufacturing cost.

The present invention has been described with a preferred embodiment thereof and it is understood that many changes and modifications in the described embodiment can be carried out without departing from the scope and the spirit of the invention that is intended to be limited only by the appended claims.

The invention claimed is:

1. A miniature lens focusing mechanism, comprising: a displaceable lens holder for holding a lens therein; said displaceable lens holder having a protruding section; at least one polygonally contoured winding element surrounding the lens holder; wherein said polygonally contoured winding element providing for limitation of torsional forces on the displaceable lens holder; whereby when the lens is turned inside the displaceable lens holder, a turning angle of the lens with respect to the displaceable lens holder is limited by said polygonally contoured winding element; at least one elastic element connected to the displaceable lens holder and the polygonally contoured winding element; wherein a downward force is directed to a portion of the elastic element contacting the protruding section of the displaceable lens holder thereby maintaining the displaceable lens holder in an initial position; and at least one magnetic element fixedly secured to an outer ring member, said polygonally contoured winding element being mounted internal said outer ring member; whereby when a current is supplied, the current is transmitted via the at least one elastic element to the at least one polygonally contoured winding element, so that a displacement force is produced between the polygonally contoured winding element and the magnetic element to displace the displaceable lens holder and accordingly for focusing said lens.

2. The miniature lens focusing mechanism as claimed in claim 1, wherein the at least one elastic element includes at least one upper plate spring and at least one lower plate spring.

3. The miniature lens focusing mechanism as claimed in claim 2, wherein the at least one upper plate spring has at least one serpentine section.

4. The miniature lens focusing mechanism as claimed in claim 1, wherein the at least one magnetic element is positioned on an inner wall of said outer ring member.

* * * * *